United States Patent Office 3,687,813
Patented Aug. 29, 1972

3,687,813
MICROBIOLOGICAL HYDROXYLATION OF 6-SUBSTITUTED-2-ISOPROPYL NAPHTHALENES
Kuang-Chao Wang, Mountain View, Calif., assignor to Syntex Corporation, Panama, Panama
No Drawing. Filed May 14, 1970, Ser. No. 37,293
Int. Cl. C12d 1/00
U.S. Cl. 195—51 R         5 Claims

ABSTRACT OF THE DISCLOSURE

Microbiological processes for hydroxylating 6-substituted - 2 - isopropyl-naphthalene compounds to the corresponding 6-substituted-naphthalene propanols (e.g. 2-(6'-methoxy - 2'-naphthyl)-1-propanol; and 2-(6'-thiomethyl-2'-naphthyl)-1-propanol). The processes are characterized by treating the 6-substituted-2-isopropyl-naphthalene compound with the species of the genus of fungi Aspergillus, identified as *Aspergillus niger*, in the presence of a nutrient medium under conditions conducive to the microbiological agent. The resulting propanol compounds exhibit analgesic, anti-inflammatory, and anti-pyretic activities in mammals and accordingly have utility where such agents are indicated. The propanol compounds can also be converted into the corresponding propionic acid compounds which also have utility as anti-inflammatory, analgesic and anti-pyretic agents in the treatment of mammals.

BACKGROUND OF THE INVENTION

(1) The invention

This invention relates to microbiological processes for hydroxylating alkyl-substituted naphthalene compounds. In a further aspect this invention relates to microbiological methods of hydroxylating 6-substituted-2-isopropyl-naphthalene compounds. In another aspect, this invention relates to microbiological methods of hydroxylating 6-substituted-2-isopropyl-naphthalene compounds to the corresponding 6-substituted-naphthyl-1-propanol compounds by the use of *Aspergillus niger*, and in a further aspect by the use of the strains of *Aspergillus niger* identified as ATCC 9142 or ATCC 9642.

(2) The prior art

The use of fungi to produce various chemical conversions is well known to the art and accordingly general background information concerning such microorganisms and general laboratory procedures and equipment required by microbiological process can, for example, be obtained from the literature such as, for example, Norris and Ribbons, "Methods in Microbiology," vol. 1, Academic Press, New York (1969); Skinner et al., "Henrici's Molds, Yeasts and Actinomycetes," Second Edition, John Wiley & Sons, New York (1947) and U.S. Patents 2,649,402 and 2,812,285.

The use of microbiological processes typically offer the advantages of affording relatively simple one-step processes of effecting chemical conversions which frequently cannot be obtained with conventional chemical processes or, if so obtainable, require onerous reaction conditions and/or a number of sequential treatments including the isolation of intermediates. The disadvantage of microbiological processes resides in the unpredictability of selecting the proper microorganisms and the effect, if any, that a given microorganism will have on a given substrate.

I have accordingly discovered felicitous one-step microbiological processes for hydroxylating 6-substituted-2-isopropyl-naphthalene compounds directly to the corresponding 2-(6'-substituted-2'-naphthyl)-propanol compounds.

SUMMARY

In summary of the processes of my invention comprise treating a 6-substituted-2-isopropyl-naphthalene compound with the species of fungi *Aspergillus niger* under conditions known to be inducive to the particular strain of *Aspergillus niger* used. Best results are obtained by using the strains of *Aspergillus niger* identified as ATCC 9142 or ATCC 9642. The microbiological treatment is preferably conducted in the presence of a suitable nutrient medium under aerobic conditions at temperatures in the range of about from 20 to 35° C. and preferably about from 20 to 30° C. The aforementioned process of my invention will be further described hereinbelow.

DESCRIPTION OF THE INVENTION AND PREFERRED EMBODIMENTS

The hydroxylation conversion effected by the microbiological process of my invention can be represented by the following schematic overall conversion equation:

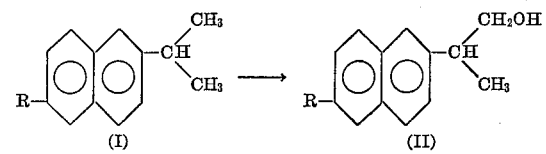

The aforementioned conversion can be effected, according to my invention, by contacting the desired 6-substituted-2-isopropyl-naphthalene substrate with the species of Aspergillus, identified as *Aspergillus niger*, in the presence of a suitable nutrient media under aerobic conditions. The above treatment is conducted at temperatures, which are conducive to the particular fungi used and optimum temperatures will accordingly vary with the particular strain of *Aspergillus niger* used. The temperatures used will typically be in the range of about from 20 to 35° C. and optimum temperatures will typically be in the range of about from 20 to 30° C. The treatment is continued for a sufficient length of time to effect the conversion, and typically about from 20 to 120 hours. The order of contacting the fungus with the substrate is not critical; for example, the substrate can be added to a culture of the fungus in a suitable nutrient medium, or a suitable nutrient medium containing the substrate can be inoculated with the desired fungi. The substrate can be in solid form, but best results are obtained by using the substrate in solution form. Suitable solvents which can be used for this purpose include, for example, dimethylformamide, dimethylsulfoxide, acetone, ethanol, and the like. Similarly, it is preferred that the nutrient medium be in the form of a solution or suspension, as Aspergillus require moisture to assimilate the necessary nutrient. The media should have an adjusted pH level or ionic strength such that it is isotonic with the Aspergillus. Typically, the pH is in the range of from about 3 to 9, optimum pHs will be a function of the particular strain of *Aspergillus niger* used and can be obtained by routine experimentation.

I have further found that best results and much higher yields are obtained by using either the strain of *Aspergillus niger* identified as ATCC 9642 or the strain identified as ATCC 9142. Where these strains are used, I have found that best results are obtained by using an incubation media pH in the range of about from 5 to 7.5 and preferably around 6.5; and temperatures in the range of about from 23 to 26° C. for about from 48 to 98 hours. The treatment can also be effected at pH's, temperatures and durations both above and below these but optimum results are obtained using these conditions.

After the conversion is completed, the hydroxylated substrate can be separated from the incubation media by any suitable separation procedure. For example, the separation can be conveniently conducted by first acidifying the incubation media and extracting the hydroxylated substrate with a suitable solvent such as, for example, chloroform, methylene dichloride, and the like. The solvent can then be removed by evaporation and the resulting 2-(6'-substituted-2'-naphthyl)-1-propanol residue further purified by any suitable method such as, for example, chromatography. The resulting product is a racemic mixture of enantiomorphs, which can be either administered as the racemic mixture or resolved by any suitable procedure. For example, the respective enantiomorphs can be conveniently resolved by selective biological degradation; or by reacting the racemic mixture with a suitable optically active acid, such as for example (—) malic acid to form the corresponding diasteromeric esters, which can then be separated by fractional crystallization. The respective optically active 2-(6'-substituted-2'-naphthyl)-1-propanol products can be obtained by treating the corresponding diasteromeric esters with a strong base such as, for example, sodium hydroxide. Alternatively, the resolution can, for example, be effected by treating the racemic mixture with phthalic acid anhydride to form the corresponding phthalic esters. The phthalic esters can then be treated with a suitable optically active amine base such as, for example, cinchonidine, to form the corresponding, respective, diastereomeric salts, which can be conveniently separated by fractional crystallization. The separated stereomeric salt can be acid cleaved to the respective esters, which can then be hydrolyzed to the corresponding, respective, optically active 2-(6'-substituted-2'-naphthyl)-propanols.

The corresponding resolved 2-(6'-substituted-2'-naphthyl)-1-propionic acids can be conveniently prepared by oxidizing the unresolved 2-(6'-substituted-2'-naphthyl)-1-propanol product to the corresponding carboxy acid (for example, via treatment with chromium trioxide) and then converting the carboxy acid to the corresponding diastereomeric salts via treatment with suitable optically active organic bases such as, for example, the alkaloids (e.g. cinchonidine). The respective diastereomeric salts can then be conveniently separated by fractional crystallization and then reconverted to their respective optically active 2-(6'-substituted-2'-naphthyl-propionic acids by acidification with a suitable mineral acid such as, for example, hydrochloric acid or sulfuric acid. If desired, the propionic acid product can in turn be converted to the respective resolved propanol enantiomorphs via reduction with diborane.

The nutrient medium should contain sufficient sources of available carbon, nitrogen, and minerals necessary to maintain and encourage growth of the particular Aspergillus specie used. Suitable sources of carbon include, for example, carbohydrates such as starches, dextrine, sugars, molasses, sorgum, and fatty acids, etc., and mixtures thereof. Suitable sources of available nitrogen include, for example, vegetable and animal proteins, soybean meal, casein, egg albumin, peptones, polypeptides, amino acids, urea, corn steep liquor, etc., and mixtures thereof. The mineral constituents are frequently present in the nutrient medium as impurities in, or components of, the sources of the other components. Desirably, the mineral sources should contain sources of heavy metals such as, for example, zinc, iron, copper, manganese, berryllium, gallium, and mixtures thereof. Additional minerals can be supplied by the addition of suitable salts of the aforementioned minerals. Suitable nutrient media compositions for various species of Aspergillus fungi can be had by reference to the literature of the art such as, for example, previously cited hereinabove, and by reference to the current edition of the catalog of Strains, published by the American Type Culture Collection, presently located in Rockville, Md.

The *Aspergillus niger* microbiological agents used in the practice of my invention, including the preferred strains, *Aspergillus niger* ATCC 9142 and *Aspergillus niger* ATCC 9642, can be obtained from known sources of *Aspergillus niger* cultures such as, for example, the American Type Culture Collection (ATCC)-12301 Portland Drive, Rockville, Md.; the Northern Utilization Research and Development Division, United States Department of Agriculture, Peoria, Ill. (NRRL); and the Quartermaster Research and Development Center, United States Army, Natick, Mass. (QM).

The 6-substituted-2-isopropyl-naphthalene substrates (Formula I) used in the practice of my invention can be prepared by treatment of the corresponding 6-substituted-2-acetyl-naphthalene with a suitable Grignard reagent, such as for example, methylmagnesium chloride, to produce the corresponding 2-(6'-substituted-2'-naphthyl)-2-propanol which can then be converted to the corresponding 2-(6'-substituted-2'-naphthyl)-propane starting materials by catalytically reductive hydrogenation. This can, for example, be conveniently effected by treating the 2-propanol with hydrogen in an ethylacetate solvent, in the presence of a palladium catalyst and catalytic quantities of perchloric acid ($HClO_4$). The 6-methoxy-; 6-thiomethyl-; 6-fluoro-; and 6-chloro-2-acetylnaphthalene compounds used to prepare the above substrates are known compounds and can be obtained from known sources or prepared according to known procedures.

As before mentioned, the microbiological processes of my invention are conducted under aerobic conditions and preferably in liquid media with agitation. Suitable procedures and apparatus for maintaining such conditions are known to the art and are, for example, described in the Methods in Microbiology reference previously cited and also in U.S. Patent No. 2,649,402.

The 2 - (6' - substituted-2'-naphthyl)-propanol products of the process of my invention exhibit anti-inflammatory activity in mammals and thus are useful in treating inflammatories of the skin, respiratory tract, musculoskeletal system, joints, internal organs and tissues. Accordingly, these compounds are useful in the treatment of conditions characterized by inflammation, such as contact dermatitis, allergic conditions, burns, rheumatism, contusion, arthritis, bone fracture, post-traumatic conditions and gout. In those cases in which the above conditions include pain, pyrexia, and pruritus, coupled with the inflammation, the instant compounds are useful for relief of these conditions as well as the inflammation. For example, the instant compounds are useful in the treatment of pain associated with post-operative conditions, post-traumatic conditions, post-partum conditions, dysmenorrhea, burns, gout, contusion, neuralgia, neuritis, headaches and rheumatic fever. As stated above, these compounds also exhibit anti-pyretic activity, accordingly, these compounds are useful in the treatment of pyrexia where reduction of fever is indicated, for example, cases where high fever is associated with diseases such as rheumatic fever, bronchitis, pneumonia, typhoid fever, Hodkin's disease, and the like. The present compounds are also useful in the treatment of pruritus where the condition exists contemporaneously with inflammation, pain and/or high fever. Moreover, the compounds are useful for treating pruritus per se.

The preferred manner of oral administration provides the use of a convenient daily dosage regimen which can be adjusted according to the degree of affliction. Generally, a daily dose of from 0.01 mg. to 20 mg. of the compound of Formulas I, II or III per kilogram of body weight of the mammal is employed. Most conditions respond to treatment comprising a dosage level in the order of .5 mg. to 5 mg. per kilogram of body weight per day. For such oral administration, a pharmaceutically acceptable non-toxic composition is formed by the incorporation of any of the normally employed excipients. Suitable pharmaceutically acceptable carriers or excipients include starch, glucose, lactose, gelatin, malt, flour, chalk, magnesium carbonate, magnesium stearate, glyceryl, monostearate, talc, dried skim milk, glycerol, water, ethanol, and the like. These compositions take the form of solutions, suspensions, tablets, pills, capsules, powders, sustained release formulations, and the like. In addition, these compounds can be administered in conjunction with other medicinal agents depending upon the specific condition being treated.

The 2-(6'-substituted-2'-naphthyl)-propanol products of the process of my invention can be oxidized to the corresponding 2 - (6'-substituted-2'-naphthyl)-propionic acids and thus also have utility as intermediates or starting materials for the aforementioned propionic acids which also have utility as anti-inflammatory, analgesic, antipyric and antipyretic agents in treatments of mammals, and can be applied in the same manner as described hereinabove.

A further understanding of my invention can be had from the following nonlimiting examples.

Example 1.—This example illustrates a method of preparing 2-(6'-substituted-2'-naphthyl)-propane starting materials. In this example 15 me. of 6-methoxy-2-acetylnaphthalene are slowly added over a period of one hour to a mixture containing 20 me. of methylmagnesium chloride in 20 cc. of ether under nitrogen, at 20° C. with constant stirring. The reaction is allowed to continue for 2 hours at 20° C. and then 60 g. of ice is added to the reaction mixture. The reaction mixture is then filtered to remove precipitated magnesium compounds (e.g. magnesium hydroxide). The filtrate is then added to 200 ml. of saturated aqueous sodium chloride solution. The ether layer is then separated from the aqueous layer, and the aqueous layer then washed twice with 20 ml. portions of ether. The ether washings are then combined with the ether layer and dried over aqueous potassium carbonate. The ether solvent is then removed from the dried solution by distillation affording crude 2-(6'-methoxy-2'-naphthyl)-2-propanol.

Five me. of the crude 2-(6'-methoxy-2'-naphthyl)-2-propanol in 50 ml. of ethyl acetate containing a few drops of perchloric acid and 0.5 grams of 5% palladium on charcoal catalyst is hydrogenated for 15 hours at atmospheric pressure at 20° C. The catalyst is then removed by filtration and the filtrate evaporated affording a 2-(6'-methoxy-2'-naphthyl)-propane residue, which is further purified by recrystallization from acetone.

By following the same procedure using the corresponding 6-substituted-naphthalene ketone starting materials, the following compounds are also prepared:

2-(6'-thiomethyl-2'-naphthyl)-propane;
2-(6'-fluoro-2'-naphthyl)-propane; and
2-(6'-chloro-2'-naphthyl)-propane.

Example 2.—This example illustrates methods, according to my invention, of hydroxylating 2 - (6' - substituted-2' - naphthyl)-propanol compounds. In this example a soybean meal-dextrose nutrient medium is prepared having the following composition: 5 g. soybean meal; 20 g. dextrose; 5 g. yeast extract; 5 g. NaCl; 5 g. $K_2HPO_4$; and sufficient distilled water to make a total of one liter of nutrient medium. The pH of the nutrient media is adjusted to 6.5 by the addition of concentrated hydrochloric acid. An *Aspergillus niger* (ATCC 9642) culture is maintained on agar slants having the following composition: 40 g. maltose; 15 g. proteose peptone #3; 20 g. agar and one liter distilled water and is then transferred from the agar slants to the soybean meal-dextrose nutrient medium. The *Aspergillus niger* is grown in this medium for 24 hours at 25° C. with rotary agitation (i.e. rotary shaker operating at 250 r.p.m., 1-inch stroke). The growing culture is then used as a supply of inoculum to inoculate the additional soybean meal-dextrose nutrient mediums. Four 400 ml. aliquots of freshly prepared soybean-dextrose nutrient mediums, having the same composition as set forth hereinabove, are respectively inoculated with 10% inoculum (i.e. 40 ml. of the inoculum). After addition of the inoculum, the respective cultures are each aerobically grown for 24 hours at 25° C. with rotary agitation. One hundred mg. of 2-isopropyl-6-methoxynaphthalene dissolved in 3 ml. of dimethylformamide is then added to the first aliquots. One hundred mg. of the following substrates dissolved in 3 ml. of dimethylformamide are also respectively added to the remaining aliquots (i.e. one substrate per aliquot); 2-(6'-thiomethyl - 2'-naphthyl)-propane; 2 - (6' - fluoro - 2' - naphthyl)-propane; and 2 - (6' - chloro - 2' - naphthyl). After the addition of the respective substrates, the incubation is aerobically continued for 72 hours at 25° C. with rotary shaking. At the end of this incubation, the fermentation medium having the 2 - (6' - methoxy - 2' - naphthyl)-propane substrate is acidified with glacial acetic acid and then extracted with methylene chloride. The methylene chloride extract is then concentrated under vacuum, affording a crude 2 - (6' - methoxy-2'-naphthyl)-propanol residue, which is further purified by chromatography over silicic acid, sequentially eluting with methylene chloride and methylene chloride-acetone mixtures (9:1). The resulting purified product is a racemic mixture of 2 - (6'-methoxy-2'-naphthyl)-propanol.

By following similar extraction and chromatographic procedure, the following compounds are respectively obtained from the remaining aliquots: 2 - (6' - thiomethyl-2' - naphthyl)-propanol; 2 - (6' - fluoro - 2' - naphthyl)-propanol; and 2-(6'-chloro-2'-naphthyl)-propanol.

Example 3.—This example illustrates methods of resolving racemic mixtures of 2 - (6' - substituted - 2'-naphthyl)propanol compounds.

Step A.—A mixture of 22 g. of 2 - (6' - methoxy-2'-naphthyl)-propanol 30 g. of phthalic anhydride and 500 ml. of pyridine is stirred for six hours at room temperature. The resulting mixture is then treated with dilute hydrochloric acid and extracted with methylene chloride. The combined extracts are sequentially washed with water, aqueous .1 N hydrochloric acid and water, to neutrality, then dried over sodium sulfate and evaporated to yield [2-(6'-methoxy-2'-naphthyl)-1-propanol] acid phthalate.

Step B.—A mixture of 36 g. of [2-(6'-methoxy-2'-naphthyl)-1-propanol] acid phthalate, 29 g. of cinchonidine, and 500 ml. of methanol is stirred for two hours; the mixture is then allowed to stand until crystallization is complete. The crystals are filtered off and washed with methanol (the filtrate and washings are collected). The crystals are recrystallized from methanol, filtered, washed and dried. The pure crystals are added to 600 ml. of 0.2 N hydrochloric acid. The resulting mixture is stirred for two hours and then extracted with diethyl ether. The extracts are combined, washed with water to neutrality, dried over sodium sulfate and evaporated.

Step C.—The resulting residue of Step B is added to a mixture of 25 g. of sodium hydroxide, 250 ml. of water and 250 ml. of tetrahydrofuran and heated under reflux. After two hours at 23° C., the mixture is extracted with methylene chloride. The combined extracts are washed with aqueous acid and then with water to neutrality, dried over sodium sulfate and evaporated to yield one of the optical enantiomers of 2-(6'-methoxy-2'-naphthyl)- propanol. The optical rotation of the enantiomer is determined by polarimetry.

The combined filtrates and washings of Step B are evaporated. This residue is treated in the same manner as the residue in Step C to yield the other optical enantiomer of 2-(6'-methoxy-2'-naphthyl)-propanol.

By following the same procedure, the remaining products of Example 2 are resolved into their respective optical enantiomers.

Example 4.—This example illustrates methods according to our invention of preparing 2 - (6' - substituted-2' - naphthyl) - propanol compounds using the strain of *Aspergillus niger* identified as *Aspergillus niger* (ATCC 9142). In this example the following compounds are prepared from the corresponding 6'-substituted substrates according to the same procedure as set forth in Example 2, with the exception of using the strain of *Aspergillus niger* ATCC 9142 in place of the strain of *Aspergillus niger* ATCC 9642; 2 - (6' - methoxy - 2' - naphthyl)-propanol; 2 - (6' - thiomethyl - 2' - naphthyl) - propanol; 2 - (6' - fluoro - 2' - naphthyl)-propanol; and 2 - (6'-chloro-2'-naphthyl)-propanol.

The above compounds are resolved into their corresponding optically active enantiometer according to the same procedure as Example 3.

Example 5.—This example illustrates a method of oxidizing the 2 - (6' - substituted - 2' - naphthyl)-propanol compounds to the corresponding 2 - (6' - substituted-2'-naphthyl)-propionic acid compounds. In this example 71 mg. of one of the optically active enantiomers of 2-(6-methoxy-2'-naphthyl)-propanol, prepared according to Example 2 and resolved according to Example 3, in 5 ml. of acetone at 0° C. is treated with 0.14 ml. of Jones' reagent during 10 minutes. After a further 2 minutes 10 ml. of dilute sodium bisulfite solution is added and the resulting product extracted into ether. Evaporation of the ether extract followed by crystallization of the residue from acetone-hexane affords the corresponding optically active enantiomer of 2-(6'-methoxy-2'-naphthyl)-propionic acid.

By following the same procedure using the other optical enantiometer of 2 - (6' - methoxy - 2' - naphthyl) - propanol and the other optical enantiomer products of Example 3 as starting materials, the other optical enantiomer of 2 - (6' - methoxy - 2' - naphthyl)-propionic acid and the respective (—) and (+) optical enantiomers of the following compounds are respectively prepared: 2 - (6'-thiomethyl-2'-naphthyl)-propionic acid; 2-(6'-fluoro-2'-naphthyl)-propionic acid; and 2-(6'-chloro-2'-naphthyl)-propionic acid.

Obviously many modifications and variations of the invention described hereinabove and in the claims can be made without departing from the essence and scope thereof.

What is claimed is:

1. A microbiological process for preparing compounds of the formula:

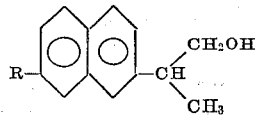

wherein R is selected from the group consisting of methoxy, thiomethyl, fluoro and chloro;

which comprises aerobically treating the corresponding 2 - (6' - substituted - 2' - naphthyl)-propane substrate with a strain of *Aspergillus niger* under conditions conducive to the growth of said *Aspergillus niger*.

2. The process of claim 1 wherein said treatment is conducted in a liquid nutrient medium at temperatures in the range of about from 20 to 35° C. for about from 24 to 120 hours.

3. The process of claim 2 wherein said nutrient medium is agitated.

4. The process of claim 1 wherein said *Aspergillus niger* strain is selected from the group of *Aspergillus niger* strains identified as *Aspergillus niger* ATCC 9142 and *Aspergillus niger* ATCC 9642.

5. The process of claim 4 wherein said treatment is conducted in a liquid nutrient medium at temperatures in the range of about from 23 to 26° C. for about from 48 to 96 hours.

References Cited
UNITED STATES PATENTS

| | | | |
|---|---|---|---|
| 3,340,155 | 9/1967 | Douros et al. | 195—51 R |
| 2,812,285 | 11/1957 | Zaffaroni et al. | 195—51 R |

ALVIN E. TANENHOLTZ, Primary Examiner

U.S. Cl. X.R.

195—28 R